US012714145B2

(12) United States Patent
Roach et al.

(10) Patent No.: US 12,714,145 B2
(45) Date of Patent: Aug. 25, 2026

(54) AEROSOL PROVISION DEVICE

(71) Applicant: NICOVENTURES TRADING LIMITED, London (GB)

(72) Inventors: Adam Roach, London (GB); Ashley John Sayed, London (GB); Mitchel Thorsen, Madison, WI (US); Luke James Warren, London (GB)

(73) Assignee: NICOVENTURES TRADING LIMITED, London (GB)

( * ) Notice: Subject to any disclaimer, the term of this patent is extended or adjusted under 35 U.S.C. 154(b) by 964 days.

(21) Appl. No.: 17/593,186

(22) PCT Filed: Mar. 9, 2020

(86) PCT No.: PCT/EP2020/056235
§ 371 (c)(1),
(2) Date: Sep. 10, 2021

(87) PCT Pub. No.: WO2020/182745
PCT Pub. Date: Sep. 17, 2020

(65) Prior Publication Data
US 2022/0151298 A1 May 19, 2022

Related U.S. Application Data

(60) Provisional application No. 62/816,313, filed on Mar. 11, 2019.

(51) Int. Cl.
*A24F 13/00* (2006.01)
*A24F 40/465* (2020.01)
(Continued)

(52) U.S. Cl.
CPC ........... *A24F 40/465* (2020.01); *H05B 6/105* (2013.01); *H05B 6/38* (2013.01)

(58) Field of Classification Search
CPC ...................................................... A24F 40/465
See application file for complete search history.

(56) References Cited

U.S. PATENT DOCUMENTS

| | | | | |
|---|---|---|---|---|
| 1,447,664 A * | 3/1923 | Hollingsworth | A24F 13/08 | 131/182 |
| 1,862,679 A * | 6/1932 | Holsman | A24F 13/22 | 206/242 |

(Continued)

FOREIGN PATENT DOCUMENTS

| | | |
|---|---|---|
| AU | 2016202613 B2 | 5/2017 |
| CN | 1209731 A | 3/1999 |

(Continued)

OTHER PUBLICATIONS

Akbar et al., "Temperature compensation of piezoresistive pressure sensors" Sensors and Actuators A, vol. 33, 1992, 8 pages.

(Continued)

*Primary Examiner* — Neil Abrams
(74) *Attorney, Agent, or Firm* — MERCHANT & GOULD P.C.

(57) ABSTRACT

An aerosol provision device includes at least one inductor coil for generating a varying magnetic field and a susceptor assembly arranged to receive aerosol generating material. The susceptor assembly is heatable by penetration with the varying magnetic field and includes a first portion defining an opening at one end of the susceptor assembly, where the opening has a first internal cross section. The susceptor assembly further includes a second portion adjacent to the first portion. The second portion has a second internal cross section that is less than the first internal cross section.

18 Claims, 12 Drawing Sheets

(51) Int. Cl.
*H05B 6/10* (2006.01)
*H05B 6/38* (2006.01)

(56) References Cited

U.S. PATENT DOCUMENTS

| | | | | | |
|---|---|---|---|---|---|
| 3,304,762 | A * | 2/1967 | Skinner | B21D 41/025 72/479 |
| 4,358,665 | A | 11/1982 | Owen | |
| 4,523,084 | A | 6/1985 | Tamura et al. | |
| 4,947,874 | A | 8/1990 | Brooks et al. | |
| 5,095,921 | A | 3/1992 | Losee et al. | |
| 5,372,148 | A | 12/1994 | McCafferty et al. | |
| 5,388,594 | A | 2/1995 | Counts et al. | |
| 5,434,386 | A | 7/1995 | Glenn et al. | |
| 5,505,214 | A * | 4/1996 | Collins | A24D 1/20 131/194 |
| 5,530,225 | A | 6/1996 | Hajaligol | |
| 5,613,505 | A | 3/1997 | Campbell et al. | |
| 5,665,262 | A * | 9/1997 | Hajaligol | A24F 40/46 131/194 |
| 5,878,752 | A * | 3/1999 | Adams | A24F 40/465 131/194 |
| 5,894,841 | A | 4/1999 | Voges | |
| 6,136,725 | A | 10/2000 | Loan et al. | |
| 6,615,840 | B1 | 9/2003 | Fournier et al. | |
| 6,766,220 | B2 | 7/2004 | McRae et al. | |
| 7,147,170 | B2 | 12/2006 | Nguyen et al. | |
| 8,079,371 | B2 | 12/2011 | Robinson et al. | |
| 8,858,717 | B2 | 10/2014 | Fan et al. | |
| 9,550,223 | B2 * | 1/2017 | Anjos | B21D 41/021 |
| 9,591,876 | B2 * | 3/2017 | Alima | A24F 40/46 |
| 10,080,388 | B2 | 9/2018 | Sebastian et al. | |
| 10,130,121 | B2 | 11/2018 | Plojoux et al. | |
| 10,194,693 | B2 | 2/2019 | Wensley et al. | |
| 10,201,185 | B2 | 2/2019 | Bleloch et al. | |
| 10,206,429 | B2 | 2/2019 | Davis et al. | |
| 10,410,897 | B2 | 9/2019 | Miwa et al. | |
| 10,568,361 | B2 * | 2/2020 | Tang | H05B 3/46 |
| 10,617,149 | B2 | 4/2020 | Malgat et al. | |
| 10,631,574 | B2 | 4/2020 | Bleloch et al. | |
| 10,757,979 | B2 | 9/2020 | Zhu | |
| 10,791,765 | B2 | 10/2020 | Li et al. | |
| 10,842,190 | B2 | 11/2020 | Lavanchy et al. | |
| 10,881,141 | B2 | 1/2021 | Fraser et al. | |
| 10,945,456 | B2 | 3/2021 | Mironov et al. | |
| 11,094,993 | B2 | 8/2021 | Sur | |
| 11,134,544 | B2 | 9/2021 | Chang et al. | |
| 11,197,497 | B2 * | 12/2021 | Lee | A24F 40/65 |
| 11,240,885 | B2 | 2/2022 | Fursa et al. | |
| 11,246,347 | B2 | 2/2022 | Reevell | |
| 11,324,258 | B2 * | 5/2022 | Batista | A24F 40/85 |
| 11,375,754 | B2 * | 7/2022 | Batista | H05B 6/105 |
| 11,382,358 | B2 | 7/2022 | Batista et al. | |
| 11,388,929 | B2 * | 7/2022 | Reevell | A24F 40/40 |
| 11,457,664 | B2 | 10/2022 | Aoun et al. | |
| 11,470,883 | B2 | 10/2022 | Kaufman et al. | |
| 11,477,861 | B2 | 10/2022 | Mironov et al. | |
| 11,478,018 | B2 | 10/2022 | Mironov et al. | |
| 11,503,676 | B2 | 11/2022 | Horrod et al. | |
| 11,510,291 | B2 | 11/2022 | Horrod et al. | |
| 11,606,846 | B2 | 3/2023 | Stura et al. | |
| 11,647,793 | B2 | 5/2023 | Lord | |
| 11,659,863 | B2 | 5/2023 | Blandino et al. | |
| 11,700,884 | B2 * | 7/2023 | An | A24F 40/53 131/329 |
| 12,022,872 | B2 * | 7/2024 | Zhang | A24F 40/51 |
| 2004/0081624 | A1 | 4/2004 | Nguyen et al. | |
| 2004/0195371 | A1 * | 10/2004 | Doud | B65D 83/303 239/550 |
| 2005/0274193 | A1 | 12/2005 | Kwon et al. | |
| 2007/0045288 | A1 | 3/2007 | Nelson | |
| 2007/0074734 | A1 | 4/2007 | Braunshteyn et al. | |
| 2007/0113665 | A1 | 5/2007 | Johnson | |
| 2009/0095312 | A1 | 4/2009 | Herbrich et al. | |
| 2010/0024517 | A1 | 2/2010 | Ratner | |
| 2010/0236546 | A1 | 9/2010 | Yamada et al. | |
| 2010/0242974 | A1 | 9/2010 | Pan | |
| 2011/0189619 | A1 | 8/2011 | Lloyd | |
| 2011/0226236 | A1 | 9/2011 | Buchberger | |
| 2011/0265806 | A1 | 11/2011 | Alarcon et al. | |
| 2012/0048266 | A1 | 3/2012 | Alelov | |
| 2012/0227752 | A1 | 9/2012 | Alelov | |
| 2012/0234821 | A1 | 9/2012 | Shimizu | |
| 2012/0242974 | A1 | 9/2012 | LaValley et al. | |
| 2012/0298220 | A1 | 11/2012 | Hidaka et al. | |
| 2014/0299125 | A1 | 10/2014 | Buchberger | |
| 2015/0136153 | A1 | 5/2015 | Lord | |
| 2015/0245660 | A1 | 9/2015 | Lord | |
| 2015/0257448 | A1 | 9/2015 | Lord | |
| 2016/0242466 | A1 | 8/2016 | Lord et al. | |
| 2017/0035114 | A1 | 2/2017 | Lord | |
| 2017/0055580 | A1 | 3/2017 | Blandino et al. | |
| 2017/0055581 | A1 | 3/2017 | Wilke et al. | |
| 2017/0055583 | A1 * | 3/2017 | Blandino | A24D 1/20 |
| 2017/0119047 | A1 | 5/2017 | Blandino et al. | |
| 2017/0119048 | A1 | 5/2017 | Kaufman et al. | |
| 2017/0119049 | A1 | 5/2017 | Blandino et al. | |
| 2017/0340016 | A1 | 11/2017 | Thorens | |
| 2017/0340017 | A1 | 11/2017 | Thorens | |
| 2018/0007972 | A1 | 1/2018 | Thorens | |
| 2018/0015237 | A1 | 1/2018 | Thorens | |
| 2018/0192700 | A1 | 7/2018 | Fraser et al. | |
| 2018/0214645 | A1 | 8/2018 | Reevell | |
| 2018/0235279 | A1 | 8/2018 | Wilke et al. | |
| 2018/0242642 | A1 | 8/2018 | Silvesstrini et al. | |
| 2018/0279681 | A1 | 10/2018 | Rojo-Calderon et al. | |
| 2018/0310623 | A1 | 11/2018 | Batista | |
| 2018/0317554 | A1 | 11/2018 | Kaufman et al. | |
| 2019/0191767 | A1 | 6/2019 | Wu et al. | |
| 2019/0208827 | A1 | 7/2019 | Mironov et al. | |
| 2019/0380391 | A1 | 12/2019 | Reevell | |
| 2020/0000148 | A1 | 1/2020 | Horrod et al. | |
| 2020/0008478 | A1 * | 1/2020 | Ouyang | H05B 3/06 |
| 2020/0022412 | A1 | 1/2020 | Abi Aoun et al. | |
| 2020/0037402 | A1 | 1/2020 | Abi Aoun et al. | |
| 2020/0163384 | A1 | 5/2020 | Rossoll et al. | |
| 2020/0214350 | A1 | 7/2020 | Courbat et al. | |
| 2020/0221772 | A1 | 7/2020 | Mironov et al. | |
| 2020/0268053 | A1 | 8/2020 | Thorsen et al. | |
| 2020/0390157 | A1 | 12/2020 | Hepworth et al. | |
| 2020/0390158 | A1 | 12/2020 | Hepworth et al. | |
| 2021/0030059 | A1 * | 2/2021 | Moloney | H05B 6/106 |
| 2021/0112859 | A1 | 4/2021 | Horrod et al. | |
| 2021/0112870 | A1 | 4/2021 | Park et al. | |
| 2021/0204603 | A1 | 7/2021 | Taurino | |
| 2021/0212368 | A1 | 7/2021 | Taurino | |
| 2021/0235762 | A1 * | 8/2021 | Jochnowitz | A24F 40/20 |
| 2021/0235763 | A1 | 8/2021 | Park et al. | |
| 2021/0251286 | A1 | 8/2021 | Taurino | |
| 2022/0030948 | A1 | 2/2022 | Zinovik et al. | |
| 2022/0183368 | A1 | 6/2022 | Abi Aoun et al. | |
| 2022/0183371 | A1 | 6/2022 | Blandino et al. | |
| 2022/0183372 | A1 | 6/2022 | Abi Aoun et al. | |
| 2022/0183373 | A1 | 6/2022 | Sayed et al. | |
| 2022/0183391 | A1 | 6/2022 | Sayed et al. | |
| 2022/0240586 | A1 | 8/2022 | Batista et al. | |
| 2023/0225420 | A1 | 7/2023 | Zainuddin et al. | |
| 2023/0292819 | A1 * | 9/2023 | Abi Aoun | A24B 15/16 131/359 |

FOREIGN PATENT DOCUMENTS

| | | | |
|---|---|---|---|
| CN | 1500546 | A | 6/2004 |
| CN | 101522244 | A | 9/2009 |
| CN | 101524187 | A | 9/2009 |
| CN | 100566769 | C | 12/2009 |
| CN | 201830899 | U | 5/2011 |
| CN | 102322893 | A | 1/2012 |
| CN | 202364801 | U | 8/2012 |
| CN | 203952405 | U | 11/2014 |
| CN | 104544570 | A | 4/2015 |
| CN | 105307524 | A | 2/2016 |
| CN | 107949288 | A | 4/2018 |
| CN | 108348004 | A | 7/2018 |

(56) References Cited

FOREIGN PATENT DOCUMENTS

| | | | |
|---|---|---|---|
| CN | 207754542 | U | 8/2018 |
| CN | 108783613 | A | 11/2018 |
| CN | 109330030 | A | 2/2019 |
| DE | 102009035973 | A1 | 4/2011 |
| EP | 0430559 | A2 | 6/1991 |
| EP | 0516293 | A1 | 12/1992 |
| EP | 1785711 | A2 | 5/2007 |
| EP | 1989946 | A1 | 11/2008 |
| EP | 2047880 | A1 | 4/2009 |
| EP | 2119375 | A1 | 11/2009 |
| EP | 2340730 | A1 | 7/2011 |
| EP | 2468118 | A1 | 6/2012 |
| EP | 2908673 | A2 | 8/2015 |
| EP | 3636084 | A1 | 4/2020 |
| GB | 2462309 | A | 2/2010 |
| GB | 2507102 | B | 12/2015 |
| JP | S5640917 | A | 4/1981 |
| JP | H02124082 | A | 5/1990 |
| JP | H069233 | U | 2/1994 |
| JP | H08511176 | A | 11/1996 |
| JP | H08511966 | A | 12/1996 |
| JP | H11002577 | | 1/1999 |
| JP | 2000132654 | A | 5/2000 |
| JP | 3392138 | B2 | 3/2003 |
| JP | 2004177579 | A | 6/2004 |
| JP | 2005517421 | A | 6/2005 |
| JP | 2005538159 | A | 12/2005 |
| JP | 2007192802 | A | 8/2007 |
| JP | 2008165769 | A | 7/2008 |
| JP | 2009525746 | A | 7/2009 |
| JP | 2010526553 | A | 8/2010 |
| JP | 2012506263 | A | 3/2012 |
| JP | 4933046 | B2 | 5/2012 |
| JP | 2012135299 | A | 7/2012 |
| JP | 5041550 | B2 | 10/2012 |
| JP | 2013524835 | A | 6/2013 |
| JP | 2014501106 | A | 1/2014 |
| JP | 2014504886 | A | 2/2014 |
| JP | 2014526275 | A | 10/2014 |
| JP | 2015537195 | A | 12/2015 |
| JP | 2017501687 | A | 1/2017 |
| JP | 2017516256 | A | 6/2017 |
| JP | 2017532006 | A | 11/2017 |
| JP | 6371928 | B1 | 7/2018 |
| JP | 2018529324 | A | 10/2018 |
| JP | 2018537957 | A | 12/2018 |
| JP | 2019186178 | A | 10/2019 |
| KR | 20040084899 | A | 10/2004 |
| KR | 20120089544 | A | 8/2012 |
| RU | 83387 | U1 | 6/2009 |
| RU | 107026 | U1 | 8/2011 |
| RU | 2603123 | C2 | 11/2016 |
| RU | 2636649 | C9 | 4/2018 |
| RU | 2670952 | C9 | 11/2018 |
| WO | WO-03095005 | A1 | 11/2003 |
| WO | WO-2007091181 | A2 | 8/2007 |
| WO | WO-2009069518 | A1 | 6/2009 |
| WO | WO-2010045670 | A1 | 4/2010 |
| WO | WO-2011067877 | A1 | 6/2011 |
| WO | WO-2011137453 | A2 | 11/2011 |
| WO | WO-2012109371 | A2 | 8/2012 |
| WO | WO-2013098395 | A1 | 7/2013 |
| WO | WO-2013138384 | A2 | 9/2013 |
| WO | WO-2015112750 | A1 | 7/2015 |
| WO | 2016108693 | A1 | 7/2016 |
| WO | WO-2017068099 | A1 | 4/2017 |
| WO | WO-2017068101 | A1 | 4/2017 |
| WO | WO-2017153443 | A1 | 9/2017 |
| WO | 2017186455 | A1 | 11/2017 |
| WO | WO-2018073376 | A1 | 4/2018 |
| WO | WO-2018099999 | A1 | 6/2018 |
| WO | WO-2018178095 | A1 | 10/2018 |
| WO | 2018220082 | A1 | 12/2018 |
| WO | 2019030168 | A1 | 2/2019 |
| WO | 2019030364 | A1 | 2/2019 |
| WO | WO-2019030000 | A1 | 2/2019 |
| WO | WO-2019030353 | A1 | 2/2019 |
| WO | WO-2019030360 | A1 | 2/2019 |
| WO | WO-2019030361 | A1 | 2/2019 |
| WO | WO-2019129552 | A1 | 7/2019 |
| WO | WO-2019129553 | A1 | 7/2019 |
| WO | WO-2020025701 | A1 | 2/2020 |
| WO | WO-2020025712 | A1 | 2/2020 |
| WO | WO-2020025714 | A1 | 2/2020 |
| WO | WO-2020025718 | A1 | 2/2020 |
| WO | WO-2020025719 | A1 | 2/2020 |
| WO | WO-2020025725 | A1 | 2/2020 |
| WO | WO-2020025727 | A1 | 2/2020 |
| WO | WO-2020025728 | A1 | 2/2020 |
| WO | WO-2020025730 | A1 | 2/2020 |
| WO | WO-2020025731 | A1 | 2/2020 |
| WO | WO-2020035454 | A1 | 2/2020 |
| WO | WO-2020064683 | A1 | 4/2020 |
| WO | WO-2020064684 | A1 | 4/2020 |
| WO | WO-2020064685 | A1 | 4/2020 |
| WO | WO-2020064686 | A1 | 4/2020 |
| WO | WO-2020120551 | A1 | 6/2020 |

OTHER PUBLICATIONS

Boge et al., "Handbuch Elektrotechnik" Wiesbaden, Germany: Vieweg Verlag, 2004, Ed. 3 ISBN: 3-528-24944-7, 6 pages.

Communication by Great Britain Application No. 2497616, mailed on Aug. 4, 2013, 2 pages.

Extended Search Report mailed Jun. 24, 2019 for European Application No. 19164911.0, 8 pages.

Freescale Semiconductor, "Miniature I2C Digital Barometer," Pressure, MPL115A2, Retrieved from the Internet: URL: https://strawberry-linux.com/pub/MPL115A2.pdf, on Oct. 19, 2011, 8 pages.

Freescale semiconductor, 100 kPa on-chip temperature compensated and calibrated silicon pressure sensors, 10 pages.

Freescale semiconductor, integrated silicon pressure sensor on-chip signal conditioned, temperature compensated and calibrated, 18 pages.

Freescale semiconductor, temperature compensation methods for the Motorola X-ducer pressure sensor element, 11 pages.

Grounds of Appeal for European Patent No. 2908673 (13774188.0), mailed on Feb. 23, 2022, 36 pages.

International Preliminary Report on Patentability for Application No. PCT/EP2013/071069, mailed on Apr. 28, 2015,13 pages.

International Preliminary Report on Patentability for Application No. PCT/EP2020/056222, mailed on Sep. 23, 2021, 14 pages.

International Preliminary Report on Patentability for Application No. PCT/EP2020/056227, mailed on Sep. 23, 2021, 11 pages.

International Preliminary Report on Patentability for Application No. PCT/GB2017/050781, mailed Feb. 27, 2018, 13 pages.

International Search Report and Written Opinion for Application No. PCT/EP2020/056227, mailed on Aug. 31, 2020, 19 pages.

International Search Report and Written Opinion for Application No. PCT/GB2017/050781 mailed Jun. 14, 2017.

International Search Report and Written Opinion for Application No. PCT/EP2020/056222, mailed Sep. 29, 2020, 25 pages.

International Search Report for Application No. PCT/EP2013/071069, mailed on Dec. 20, 2013, 3 pages.

Lu Y., et al., "Photonic Crystal Based All-Optical Pressure Sensor," 2011, pp. 621-623.

Mozek et al., "Digital Temperature Compensation of Capacitive Pressure Sensors" Informacije, vol. 40, 2010.

Notice of Opposition mailed Feb. 19, 2020 for European Application No. 13774188.0, 95 pages.

Observations by third parties for European Patent No. 2908673 (13774188.0), mailed May 26, 2021, 13 pages.

Office Action for Japanese Application No. 2018-086172, mailed on Dec. 8, 2020, 5 pages.

Office Action mailed Feb. 3, 2020 for Japanese Application No. 2018-086172, 17 pages.

Office Action mailed Mar. 14, 2022 for Russian Application No. 2021126453, 19 pages.

(56) References Cited

OTHER PUBLICATIONS

Office Action mailed Mar. 15, 2016 for Japanese Patent Application No. 2015-537195, 2 pages.
Office Action mailed Oct. 17, 2016 for Korean Application No. 10-2015-7010071, 13 pages.
Office Action mailed Jul. 24, 2019 for Korean Application No. 10-2018-7035809, 22 pages.
Office Action mailed Sep. 26, 2016 for Chinese Application No. 201380054420.1 , 8 pages.
Office Action mailed Sep. 7, 2022 for Russian Application No. 2021126533, 8 pages.
Search Report for Chinese Application No. 201910151850.4 mailed on Apr. 28, 2021, 2 pages.
Search Report mailed Aug. 23, 2017 for Japanese Application No. 2016-227701, 26 pages (40 pages with translation).
Search Report mailed Jul. 26, 2016, and Decision to Grant mailed Aug. 24, 2016, for Russian Application No. 2015114090, 14 pages.
Second Office Action for Chinese Application No. 201710348338.X, mailed Mar. 25, 2020, 17 pages.
Second Office Action and Supplemental Search mailed Jun. 19, 2017 for Chinese Application No. 201380054420.1.
Silicon Microstructures, Active Temperature Compensation and Calibration for MEMS pressure sensors with constant voltage, 6 pages.
Stiny et al., "Grundwissen Elektrotechnik und Elektronik," Haag a. d. Am per, Germany: SpringerVieweg, 2018, Ed. 7 ISBN: 978-3-658-18318-9, 3 pages.
Wikipedia, "Electronic Cigarette," Retrieved from the Internet: URL: https://en.wikipedia.org/w/index.php?title=Electronic_cigarette, version of Sep. 18, 2012, 17 pages.
International Search Report and Written Opinion of International Application No. PCT/EP2020/056235, mailed May 29, 2020, 13 pages.
"International Preliminary Report on Patentability received for PCT Patent Application No. PCT/EP2020/056235, mailed on Sep. 23, 2021", 8 pages.
"Office Action received for Chinese Patent Application No. 202080035093.5, mailed on Jun. 26, 2023", 17 pages (9 pages of English Translation and 8 pages of Official Copy).
"Office Action received for Japanese Patent Application No. 2021-554595, mailed on Feb. 21, 2023", 6 pages (3 pages of English Translation and 3 pages of Official Copy Only).
"Reasons for Refusal received for Japanese Patent Application No. 2021-554589, mailed on Nov. 29, 2022", 8 pages (4 pages of English Translation and 4 pages of Official Copy).
"Reasons for Rejection received for Japanese Patent Application No. 2021-554595, mailed on Oct. 25, 2022", 7 pages (3 pages of English Translation and 4 pages of Official Copy).
"Search Report received for Russian Patent Application No. 2021126577, mailed on Oct. 4, 2022", 2 pages (Official Copy Only).
"Chinese Office Action, Application No. 201380054420.1 , dated Sep. 26, 2016", 8 pages Official Copy.
"European Extended Search Report, Application No. 19164911.0, dated Jun. 24, 2019", 8 pages.
"European Notice of Opposition, Application No. 13774188.0, dated Feb. 19, 2020", 95 pages.
"Extended European Search Report received for European Patent Application No. 24177451.2, mailed on Sep. 6, 2024", 12 pages.
"Japanese Decision to Grant, Application No. 2018-086172, dated Dec. 8, 2020", 5 pages.
"Japanese Office Action, Application No. 2018-086172, dated Feb. 3, 2020", 17 pages.(8 pages of English Translation and 9 pages of Official Copy).
"Korean Office Action, Application No. 10-2015-7010071, dated Oct. 17, 2016", 13 Pages of English Translation.
"Reasons for Refusal received for Japanese Patent Application No. 2023-135334, mailed on Oct. 1, 2024", 7 pages (3 pages of English Translation and 4 pages of Official Copy).
"Russian Search Report dated Jul. 26, 2016, and Decision to Grant dated Aug. 24, 2016, for Russian Application No. 2015114090", 14 Pages Official Copy.
Akbar , et al., "Temperature Compensation of Piezoresistive Pressure Sensors", Sensors and Actuators A, vol. 33, 1992., pp. 155-162.
Lu , et al., "Photonic Crystal Based All-Optical Pressure Sensor", MEMS, Jan. 23-27, 2011, pp. 621-624.
Mozek, et al., "Digital Temperature Compensation of Capacitive Pressure Sensors", Informacije, vol. 40, 2010., pp. 38-44.
Notice of Reasons for Rejection issued in corresponding JP application No. 2024-033645 on Nov. 25, 2025.

* cited by examiner

AEROSOL PROVISION DEVICE

PRIORITY CLAIM

The present application is a National Phase entry of PCT Application No. PCT/EP2020/056235, filed Mar. 9, 2020, which claims priority from U.S. Provisional Application No. 62/816,313, filed Mar. 11, 2019, each of which is hereby fully incorporated herein by reference.

TECHNICAL FIELD

The present disclosure relates to an aerosol provision device, a method of manufacturing a heater assembly for an aerosol provision device, and a heater assembly.

BACKGROUND

Smoking articles such as cigarettes, cigars and the like burn tobacco during use to create tobacco smoke. Attempts have been made to provide alternatives to these articles that burn tobacco by creating products that release compounds without burning. Examples of such products are heating devices which release compounds by heating, but not burning, the material. The material may be for example tobacco or other non-tobacco products, which may or may not contain nicotine.

SUMMARY

According to a first aspect of the present disclosure, there is provided an aerosol provision device comprising: at least one coil and a heater assembly arranged to receive aerosol generating material, wherein at least a portion of the heater assembly is heatable by the at least one coil. The heater assembly comprises: a first portion defining an opening at one end of the heater assembly, the opening having a first internal cross section and a second portion adjacent the first portion, the second portion having a second internal cross section, wherein the first internal cross section is greater than the second internal cross section.

According to a second aspect of the present disclosure, there is provided a method of manufacturing a heater assembly for an aerosol provision device comprising: providing a heater assembly having a generally constant internal cross section along its length and increasing an internal cross section at one end of the heater assembly, such that the internal cross section at the one end is greater than the generally constant internal cross section adjacent the one end.

According to a third aspect of the present disclosure, there is provided a heater assembly for an aerosol provision device, wherein the heater assembly is hollow to receive aerosol generating material, and wherein the heater assembly has a flared end.

According to another aspect of the present disclosure, there is provided an aerosol provision device comprising: at least one inductor coil for generating a varying magnetic field; and a susceptor assembly arranged to receive aerosol generating material, wherein at least a portion of the susceptor assembly is heatable by penetration with the varying magnetic field. The susceptor assembly comprises: a first portion defining an opening at one end of the susceptor assembly, the opening having a first internal cross section, and a second portion adjacent the first portion, the second portion having a second internal cross section, wherein the first internal cross section is greater than the second internal cross section. Further features and advantages of the present disclosure will become apparent from the following description of embodiments, given by way of example only, which is made with reference to the accompanying drawings.

DETAILED DESCRIPTION

Figure 1:
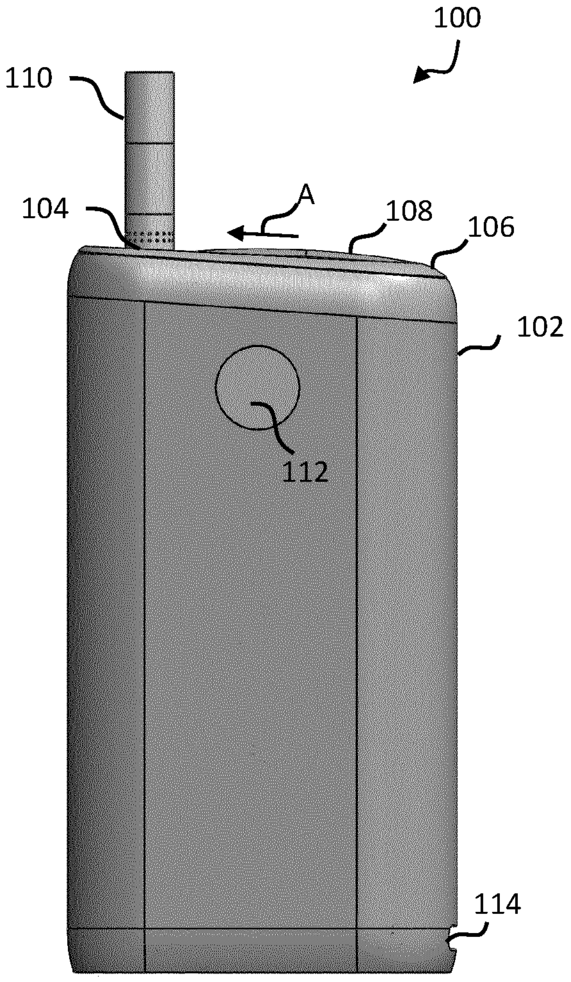
FIG. 1 shows a front view of an example of an aerosol provision device according to an embodiment.

As used herein, the term “aerosol generating material” includes materials that provide volatilized components upon heating, typically in the form of an aerosol. Aerosol generating material includes any tobacco-containing material and may, for example, include one or more of tobacco, tobacco derivatives, expanded tobacco, reconstituted tobacco or tobacco substitutes. Aerosol generating material also may include other, non-tobacco, products, which, depending on the product, may or may not contain nicotine. Aerosol generating material may for example be in the form of a solid, a liquid, a gel, a wax or the like. Aerosol generating material may for example also be a combination or a blend of materials. Aerosol generating material may also be known as “smokable material”.

Apparatus is known that heats aerosol generating material to volatilize at least one component of the aerosol generating material, typically to form an aerosol which can be inhaled, without burning or combusting the aerosol generating material. Such apparatus is sometimes described as an “aerosol generating device”, an “aerosol provision device”, a “heat-not-burn device”, a “tobacco heating product device” or a “tobacco heating device” or similar. Similarly, there are also so-called e-cigarette devices, which typically vaporize an aerosol generating material in the form of a liquid, which may or may not contain nicotine. The aerosol generating material may be in the form of or be provided as part of a rod, cartridge or cassette or the like which can be inserted into the apparatus. A heater for heating and volatilizing the aerosol generating material may be provided as a "permanent" part of the apparatus.

An aerosol provision device can receive an article comprising aerosol generating material for heating. An "article" in this context is a component that includes or contains in use the aerosol generating material, which is heated to volatilize the aerosol generating material, and optionally other components in use. A user may insert the article into the aerosol provision device before it is heated to produce an aerosol, which the user subsequently inhales. The article may be, for example, of a predetermined or specific size that is configured to be placed within a heating chamber of the device which is sized to receive the article.

A first aspect of the present disclosure defines an aerosol provision device with a heater assembly which receives aerosol generating material. For example, the heater assembly may be substantially tubular (i.e. hollow) and can receive the aerosol generating material therein. In one example, the aerosol generating material is tubular or cylindrical in nature, and may be known as a "tobacco stick", for example, the aerosolizable material may comprise tobacco formed in a specific shape which is then coated, or wrapped in one or more other materials, such as paper or foil.

At least a portion of the heater assembly is heated by at least one coil. The heated heater assembly in turn heats the aerosol generating material located within the heater assembly. To ensure that the aerosol generating material is heated most efficiently, the internal surface of the heater assembly should be arranged in close proximity to, or in contact with, the outer surface of the aerosol generating material. However, it has been found that this arrangement can make it difficult for a user to insert the aerosol generating material. In addition, the close nature of the fit between the heater assembly and the aerosol generating material can cause damage to the aerosol generating material and/or one or more materials which surround the aerosol generating material during insertion. For example, a user may inadvertently misalign an article comprising the aerosol generating material as it is inserted into the hollow heater assembly. This misalignment can cause the article to stub the edge of the heater assembly at the end of the heater assembly, which can potentially rip or damage the article.

Accordingly, to allow the aerosol generating material to be inserted more easily, the heater assembly has a flared end which is wider than the main part of the heater assembly where heating takes place. The flared end therefore has an internal cross-sectional area that is greater than the main part of the heater assembly. This forms a wider opening at one end of the heater assembly which makes it easier for the user to insert the aerosol generating material. The heater assembly therefore comprises a first portion defining an opening at one end of the heater assembly, where the opening has a first internal cross section, and a second portion adjacent the first portion which has a second internal cross section, where the first internal cross section is greater than the second internal cross section. The second portion is therefore positioned further away from the opening than the first portion. The user inserts the aerosol generating material into the heater assembly via the opening.

In a particular example, the at least one coil comprises at least one inductor coil for generating a varying magnetic field, and the heater assembly is a susceptor assembly. At least a portion of the susceptor assembly is heatable by penetration with the varying magnetic field. Thus, the aerosol provision device may comprise an inductive heater.

The first and second internal cross sections may have any shape, such as circular, square, rectangular or elliptical. The first and second internal cross sections may, in some examples, have the same shape or a different shape. The heater assembly, as a whole, may comprise a longitudinal axis, and the first and second internal cross sections are defined in a direction substantially perpendicular to the longitudinal axis.

The first and second portions of the heater assembly may abut each other, and are therefore directly adjacent or contiguous. In an alternative construction the first and second portions may be spaced apart from each other.

In a particular example, the heater assembly has a length dimension (measured in a direction parallel to the longitudinal axis of the heater assembly), of about 40 mm to about 60 mm. In another example, the heater assembly has a length dimension of about 40 mm to about 50 mm. More particularly, the heater assembly may have a length dimension of about 44 mm to about 45 mm.

The first and second internal cross sections may be coaxial. For example, the geometric centers of the first and second cross sections are aligned along an axis, such as the longitudinal axis of the heater assembly. The second portion may define an axis through its center, and the first portion is displaced along the axis and is centered on the axis. Such a construction provides a more uniform arrangement, which can make it easier for the user to insert the aerosol generating material because the user does not need to position the article towards a particular edge/side of the opening. Additionally, this arrangement allows the aerosol generating material to be inserted along a single axis so an article, comprising the aerosol generating material, does not bend as it is inserted.

The first and second internal cross sections may be similar (in the mathematical sense). In other words, the first and second internal cross sections may have the same shape cross section (albeit with different sizes). Such a construction can mean that the heater assembly is manufactured more easily, and/or allows the aerosol generating material to be inserted more easily without catching on an internal surface of the second portion as the aerosol generating material is moved into the second portion. In a particular example, the cross section of the aerosol generating material has the same shape as the first and second internal cross sections.

The first portion may have an internal cross section which decreases from the first cross section to the second cross section. In other words, from the opening to the second portion, the internal cross section is decreasing in area and width at various points along the longitudinal axis of the heater assembly and so the cross section of the first portion progressively gets smaller along its length (measured in a direction away from the opening, parallel to the longitudinal axis of the heater assembly). The internal cross section may have a constant decrease (i.e. the internal surface of the heater assembly has a constant gradient), leading to a conical-like shape, or may have a varying decrease (i.e. the internal surface of the heater assembly has a varying gradient), leading to a horn shape. Thus, the flared first portion may have either a constant or varying decrease in cross section. The first portion may have a monotonically decreasing cross section.

The heater assembly may be funnel shaped. Thus, the first portion may be flared, and the second portion may have a constant size (or varying size) cross-section along its length.

In examples where the second portion has a varying cross section along its length, then the heater assembly (as a whole) may be said to be flared/tapered.

The second portion may have a generally constant internal cross section. Thus, the second portion may have a cross-section that does not vary long its length as measured in a direction parallel to the longitudinal axis of the heater assembly. The second portion of the heater assembly therefore has an internal cross section that is equal to the second internal cross section. Such a construction may be easier to manufacture. For example, a heater assembly having a generally constant internal cross section may initially be provided and, during manufacture, the perimeter of the heater assembly at one end is increased to form the flared end.

In some examples, the heater assembly has a generally constant external cross section, such that only the internal cross section varies in size along the length of the heater assembly.

The second portion may extend from the first portion to another end of the heater assembly. Thus, the heater assembly may comprise only the first portion and the second portion so that the heater assembly has the first portion at one end, and the second portion extends from the first portion to an opposite/bottom end of the heater assembly.

The heater assembly may define an axis, such as a longitudinal axis, and the first portion may have a length dimension of less than about 5 mm, less than about 4 mm, less than about 3 mm, or less than about 1 mm, and/or greater than about 0.1 mm, or greater than about 0.5 mm, for example between about 0.1 mm to 5 mm measured along the axis.

The heater assembly may define an axis, such as a longitudinal axis, and the first portion may have a first length dimension measured along the axis, the heater assembly may have a second length dimension measured along the axis, and the first length dimension may be less than about 10%, less than about 5% or less than about 1% of the second length dimension.

These dimensions provide a balance between allowing easy insertion of the aerosol generating material, while ensuring that the heater assembly is relatively compact and that heat losses within the heater assembly are minimized or reduced. For example, if the length of the first flared portion is too long, then it may mean that the aerosol generating material is not heated as evenly, or it may impact on airflow through the aerosol generating material during use.

The heater assembly may define an axis, such as a longitudinal axis, and an angle of about 50° to about 70°, or about 50° to about 60°, is subtended between the axis and a tangent to an inner surface of the heater assembly at the opening of the heater assembly. Accordingly, the first portion is flared outwards from the axis by a particular angle. A larger angle can allow the aerosol generating material to be inserted more easily because a user is likely to catch an edge of the material on an edge of the heater assembly, for example leading to damage or tearing of an outer wrapping layer. Angles within these ranges provide a good balance between allowing easy insertion of the aerosol generating material, while ensuring that the heater assembly is relatively compact and that heat losses within the heater assembly are minimized or reduced. For example, if the angle is too great, it may have a greater impact on heating and airflow.

The heater assembly may define an axis, such as a longitudinal axis, and the first internal cross section has a greatest dimension of greater than about 5 mm, or greater than about 6 mm, and/or less than about 10 mm, or less than about 7 mm measured in a direction perpendicular to the axis. For example, the first internal cross section may have a greatest dimension of about 6 mm to about 10 mm, about 6 mm to about 7 mm, or about 6.5 mm measured in a direction perpendicular to the axis. These dimensions can provide a balance between allowing easy insertion of the aerosol generating material, while ensuring that the heater assembly is relatively compact and that heat losses within the heater assembly are minimized.

The "greatest dimension" is the distance between two points on a perimeter of the cross section which are separated by the furthest distance. For example, the greatest dimension is a diameter in examples where the cross section is circular, and the greatest dimension is the length of the diagonal in examples where the cross section is square or rectangular.

The heater assembly may define an axis, such as a longitudinal axis, and the second internal cross section has a greatest dimension of greater than about 4 mm, or greater than about 5 mm, and/or less than about 7 mm, or less than about 6 mm measured in a direction perpendicular to the axis. For example, the second internal cross section may have a greatest dimension of about 4 mm to about 7 mm, about 5 mm to about 6 mm, or about 5.5 mm to about 5.6 mm measured in a direction perpendicular to the axis.

The heater assembly may define an axis, such as a longitudinal axis, and a perimeter of the first internal cross section extends about 0.4 mm to about 3 mm, about 0.4 mm to about 2 mm, about 0.4 mm to about 1 mm, or about 0.4 mm to about 0.5 mm further from the axis than a perimeter of the second internal cross section. Accordingly, the width of the first internal cross section is wider than the width of the second internal cross section. The width dimension is measured in a direction perpendicular to the axis. This can allow the opening to be large enough so that the aerosol generating material can be inserted easily, but not too wide so as to compromise heating efficiency, for example. In addition these dimensions allow the heater to mate with other components of the device, such as an expansion chamber.

The heater assembly may have a unitary construction. A unitary construction can mean that the heater assembly is easier to manufacture, and is less likely to fracture. In such an example, the heater assembly may be said to be formed from electrically conducting material. For example, the first and second portions may comprise electrically conducting material, such as carbon steel.

In a second aspect of the present disclosure, a method of manufacturing a heater assembly comprises (i) providing a heater assembly having a generally constant internal cross section along its length and (ii) increasing an internal cross section at one end of the heater assembly, such that the internal cross section at the one end is greater than the generally constant internal cross section adjacent the one end.

The length of the heater assembly is measured in a direction parallel to a longitudinal axis of the heater assembly.

Providing a heater assembly having a generally constant internal cross section along its length may comprise providing a heater assembly having an internal cross section with a width dimension of about 4 mm to 7 mm. Increasing an internal cross section at one end of the heater assembly may comprise increasing the width dimension of the internal cross section by about 1 mm to 6 mm. Other dimensions may also be used, such as those described above.

In some alternative examples, the heater assembly initially has an internal cross section which varies along its length and the method comprises increasing an internal cross section at one end of the heater assembly.

Increasing the internal cross section may comprise swaging. Swaging may comprise inserting an object into the heater assembly, where at least a portion of the object has an external cross section greater than the internal cross section of the heater assembly. For example, the object may be inserted by applying a force, which causes the end of the heater assembly to widen.

The end of the heater assembly may be heated before increasing the internal cross section. The application of heat can make the heater assembly more malleable, reducing the force required to widen the end of the heater assembly.

Providing a heater assembly may comprise providing a heater assembly with a unitary construction. For example the heater assembly may be formed by extrusion or drawing.

In a third aspect of the present disclose the heater assembly may be hollow to receive aerosol generating material, and the heater assembly has a flared end. Any of the above described features and parameters may also apply to the heater assembly of the third aspect.

In some examples, the first portion (i.e. the flared end) of the heater assembly is not made from electrically conducting material, and is therefore not heated inductively as a result of the magnetic field(s) from the inductor coil(s). The second portion of the heater assembly may comprise electrically conducting material and is heated inductively. The heater assembly may therefore comprise a mixture of electrically conducting material and non-electrically conducting material. The first portion may comprise a plastics material, such as PEEK, for example. The first portion may be connected to the second portion or may abut the second portion. The first portion may therefore be part of the device and is tapered/flared to guide the article into the second portion. The first portion may be thermally insulating, so is not heated by the coil.

As mentioned, the heater assembly may be known as a susceptor assembly. A susceptor assembly may also be known as a susceptor.

In another example, the heater assembly/susceptor has a diameter that is greater than the diameter of the article (i.e. rather than a diameter that is substantially the same size). For example, the diameter of the heater assembly may be greater than the diameter of the article by at least 0.1 mm, or at least 0.5 mm, or at least 1 mm, to allow easier insertion of the article. The device may comprise a securement member, such as a pin, which can engage the article to hold the article in place within the heater assembly. The pin, for example, may be inserted into the distal end of the article.

As briefly mentioned above, in some examples, the coil(s) is/are configured to, in use, cause heating of at least one electrically-conductive heating assembly/component/element (also known as a heater assembly/component/element), so that heat energy is conductible from the at least one electrically-conductive heating component to aerosol generating material to thereby cause heating of the aerosol generating material.

In some examples, the coil(s) is/are configured to generate, in use, a varying magnetic field for penetrating at least one heating assembly/component/element, to thereby cause induction heating and/or magnetic hysteresis heating of the at least one heating component. In such an arrangement, the (or each) heating component may be termed a "susceptor". A coil that is configured to generate, in use, a varying magnetic field for penetrating at least one electrically-conductive heating component, to thereby cause induction heating of the at least one electrically-conductive heating component, may be termed an "induction coil" or "inductor coil".

The device may include the heating component(s), for example electrically-conductive heating component(s), and the heating component(s) may be suitably located or locatable relative to the coil(s) to enable such heating of the heating component(s). The heating component(s) may be in a fixed position relative to the coil(s). Alternatively, both the device and such an article may comprise at least one respective heating component, for example at least one electrically-conductive heating component, and the coil(s) may be to cause heating of the heating component(s) of each of the device and the article when the article is in the heating zone.

In some examples, the coil(s) is/are helical. In some examples, the coil(s) encircles at least a part of a heating zone of the device that is configured to receive aerosol generating material. In some examples, the coil(s) is/are helical coil(s) that encircles at least a part of the heating zone. The heating zone may be a receptacle, shaped to receive the aerosol generating material.

In some examples, the device comprises an electrically-conductive heating component that at least partially surrounds the heating zone, and the coil(s) is/are helical coil(s) that encircles at least a part of the electrically-conductive heating component. In some examples, the electrically-conductive heating component is tubular. In some examples, the coil is an inductor coil.

FIG. 1 shows an example of an aerosol provision device 100 for generating aerosol from an aerosol generating medium/material. In broad outline, the device 100 may be used to heat a replaceable article 110 comprising the aerosol generating medium, to generate an aerosol or other inhalable medium which is inhaled by a user of the device 100.

The device 100 comprises a housing 102 (in the form of an outer cover) which surrounds and houses various components of the device 100. The device 100 has an opening 104 in one end, through which the article 110 may be inserted for heating by a heating assembly. In use, the article 110 may be fully or partially inserted into the heating assembly where it may be heated by one or more components of the heater assembly.

The device 100 of this example comprises a first end member 106 which comprises a lid 108 which is moveable relative to the first end member 106 to close the opening 104 when no article 110 is in place. In FIG. 1, the lid 108 is shown in an open configuration, however the cap 108 may move into a closed configuration. For example, a user may cause the lid 108 to slide in the direction of arrow "A".

The device 100 may also include a user-operable control element 112, such as a button or switch, which operates the device 100 when pressed. For example, a user may turn on the device 100 by operating the switch 112.

The device 100 may also comprise an electrical component, such as a socket/port 114, which can receive a cable to charge a battery of the device 100. For example, the socket 114 may be a charging port, such as a USB charging port. In some examples the socket 114 may be used additionally or alternatively to transfer data between the device 100 and another device, such as a computing device.

Figure 2:
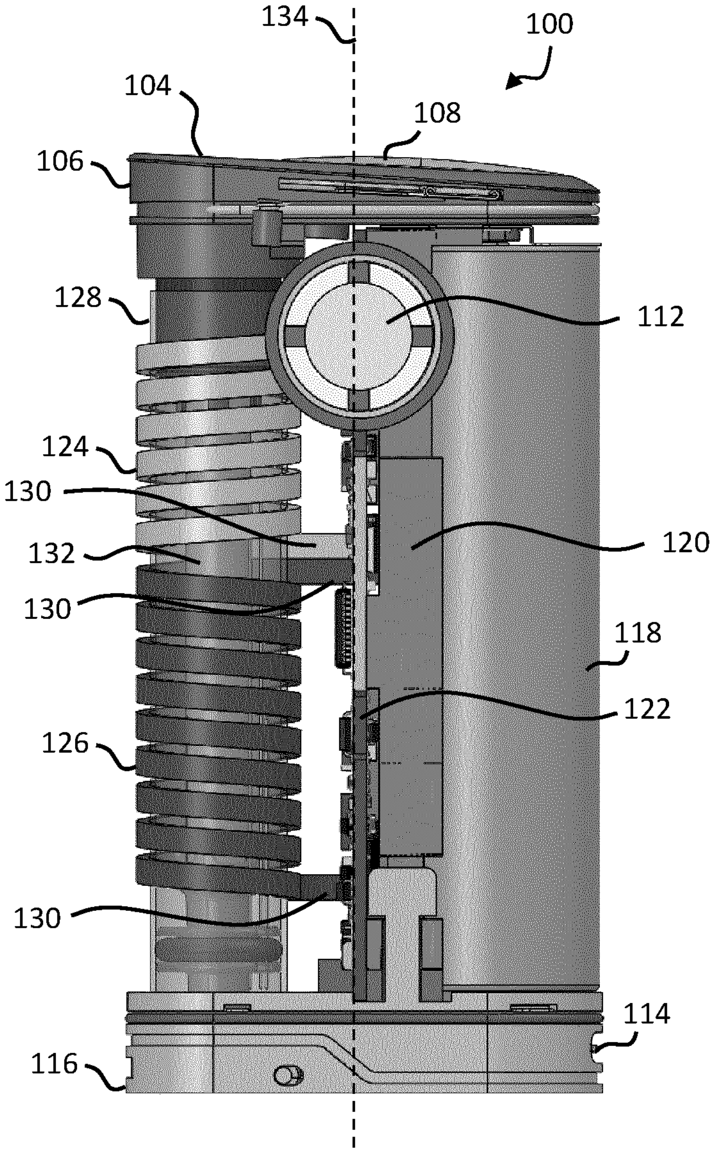
FIG. 2 shows a front view of the aerosol provision device of FIG. 1 with an outer cover removed.

FIG. 2 depicts the device 100 of FIG. 1 with the outer cover 102 removed and without an article 110 present. The device 100 defines a longitudinal axis 134.

As shown in FIG. 2, the first end member 106 is arranged at one end of the device 100 and a second end member 116 is arranged at an opposite end of the device 100. The first and second end members 106, 116 together at least partially define end surfaces of the device 100. For example, the bottom surface of the second end member 116 at least partially defines a bottom surface of the device 100. Edges of the outer cover 102 may also define a portion of the end surfaces. In this example, the lid 108 also defines a portion of a top surface of the device 100.

The end of the device closest to the opening 104 may be known as the proximal end (or mouth end) of the device 100 because, in use, it is closest to the mouth of the user. In use, a user inserts an article 110 into the opening 104, operates the user control 112 to begin heating the aerosol generating material and draws on the aerosol generated in the device. This causes the aerosol to flow through the device 100 along a flow path towards the proximal end of the device 100.

The other end of the device furthest away from the opening 104 may be known as the distal end of the device 100 because, in use, it is the end furthest away from the mouth of the user. As a user draws on the aerosol generated in the device, the aerosol flows away from the distal end of the device 100.

The device 100 further comprises a power source 118. The power source 118 may be, for example, a battery, such as a rechargeable battery or a non-rechargeable battery. Examples of suitable batteries include, for example, a lithium battery, (such as a lithium-ion battery), a nickel battery (such as a nickel-cadmium battery), and an alkaline battery. The battery is electrically coupled to the heating assembly to supply electrical power when required and under control of a controller (not shown) to heat the aerosol generating material. In this example, the battery is connected to a central support 120 which holds the battery 118 in place.

The device further comprises at least one electronics module 122. The electronics module 122 may comprise, for example, a printed circuit board (PCB). The PCB 122 may support at least one controller, such as a processor, and memory. The PCB 122 may also comprise one or more electrical tracks to electrically connect together various electronic components of the device 100. For example, the battery terminals may be electrically connected to the PCB 122 so that power can be distributed throughout the device 100. The socket 114 may also be electrically coupled to the battery via the electrical tracks.

In the example device 100, the heating assembly is an inductive heating assembly and comprises various components to heat the aerosol generating material of the article 110 via an inductive heating process. Induction heating is a process of heating an electrically conducting object (such as a susceptor) by electromagnetic induction. An induction heating assembly may comprise an inductive element, for example, one or more inductor coils, and a device for passing a varying electric current, such as an alternating electric current, through the inductive element. The varying electric current in the inductive element produces a varying magnetic field. The varying magnetic field penetrates a susceptor suitably positioned with respect to the inductive element, and generates eddy currents inside the susceptor. The susceptor has electrical resistance to the eddy currents, and hence the flow of the eddy currents against this resistance causes the susceptor to be heated by Joule heating. In cases where the susceptor comprises ferromagnetic material such as iron, nickel or cobalt, heat may also be generated by magnetic hysteresis losses in the susceptor, i.e. by the varying orientation of magnetic dipoles in the magnetic material as a result of their alignment with the varying magnetic field. In inductive heating, as compared to heating by conduction for example, heat is generated inside the susceptor, allowing for rapid heating. Further, there need not be any physical contact between the inductive heater and the susceptor, allowing for enhanced freedom in construction and application.

The induction heating assembly of the example device 100 comprises a susceptor assembly 132 (herein referred to as "a susceptor"), a first inductor coil 124 and a second inductor coil 126. The first and second inductor coils 124, 126 are made from an electrically conducting material. In this example, the first and second inductor coils 124, 126 are made from Litz wire/cable which is wound in a helical fashion to provide helical inductor coils 124, 126. Litz wire comprises a plurality of individual wires which are individually insulated and are twisted together to form a single wire. Litz wires are designed to reduce the skin effect losses in a conductor. In the example device 100, the first and second inductor coils 124, 126 are made from copper Litz wire which has a rectangular cross section. In other examples the Litz wire can have other shape cross sections, such as circular.

The first inductor coil 124 is configured to generate a first varying magnetic field for heating a first section of the susceptor 132 and the second inductor coil 126 is configured to generate a second varying magnetic field for heating a second section of the susceptor 132. In this example, the first inductor coil 124 is adjacent to the second inductor coil 126 in a direction along the longitudinal axis 134 of the device 100 (that is, the first and second inductor coils 124, 126 to not overlap). The susceptor assembly 132 may comprise a single susceptor, or two or more separate susceptors. Ends 130 of the first and second inductor coils 124, 126 can be connected to the PCB 122.

It will be appreciated that the first and second inductor coils 124, 126, in some examples, may have at least one characteristic different from each other. For example, the first inductor coil 124 may have at least one characteristic different from the second inductor coil 126. More specifically, in one example, the first inductor coil 124 may have a different value of inductance than the second inductor coil 126. In FIG. 2, the first and second inductor coils 124, 126 are of different lengths such that the first inductor coil 124 is wound over a smaller section of the susceptor 132 than the second inductor coil 126. Thus, the first inductor coil 124 may comprise a different number of turns than the second inductor coil 126 (assuming that the spacing between individual turns is substantially the same). In yet another example, the first inductor coil 124 may be made from a different material to the second inductor coil 126. In some examples, the first and second inductor coils 124, 126 may be substantially identical.

In this example, the first inductor coil 124 and the second inductor coil 126 are wound in opposite directions. This is can be useful when the inductor coils are active at different times. For example, initially, the first inductor coil 124 may be operating to heat a first section of the article 110, and at a later time, the second inductor coil 126 may be operating to heat a second section of the article 110. Winding the coils in opposite directions helps reduce the current induced in the inactive coil when used in conjunction with a particular type of control circuit. In FIG. 2, the first inductor coil 124 is a right-hand helix and the second inductor coil 126 is a left-hand helix. However, in another embodiment, the inductor coils 124, 126 may be wound in the same direction, or the first inductor coil 124 may be a left-hand helix and the second inductor coil 126 may be a right-hand helix.

The susceptor 132 of this example is hollow and therefore defines a receptacle within which aerosol generating material is received. For example, the article 110 can be inserted into the susceptor 132. In this example the susceptor 120 is tubular, with a circular cross section.

The device 100 of FIG. 2 further comprises an insulating member 128 which may be generally tubular and at least partially surround the susceptor 132. The insulating member 128 may be constructed from any insulating material, such as plastic for example. In this particular example, the insulating member is constructed from polyether ether ketone (PEEK). The insulating member 128 may help insulate the various components of the device 100 from the heat generated in the susceptor 132.

The insulating member 128 can also fully or partially support the first and second inductor coils 124, 126. For example, as shown in FIG. 2, the first and second inductor coils 124, 126 are positioned around the insulating member 128 and are in contact with a radially outward surface of the insulating member 128. In some examples the insulating member 128 does not abut the first and second inductor coils 124, 126. For example, a small gap may be present between the outer surface of the insulating member 128 and the inner surface of the first and second inductor coils 124, 126.

In a specific example, the susceptor 132, the insulating member 128, and the first and second inductor coils 124, 126 are coaxial around a central longitudinal axis of the susceptor 132.

Figure 3:
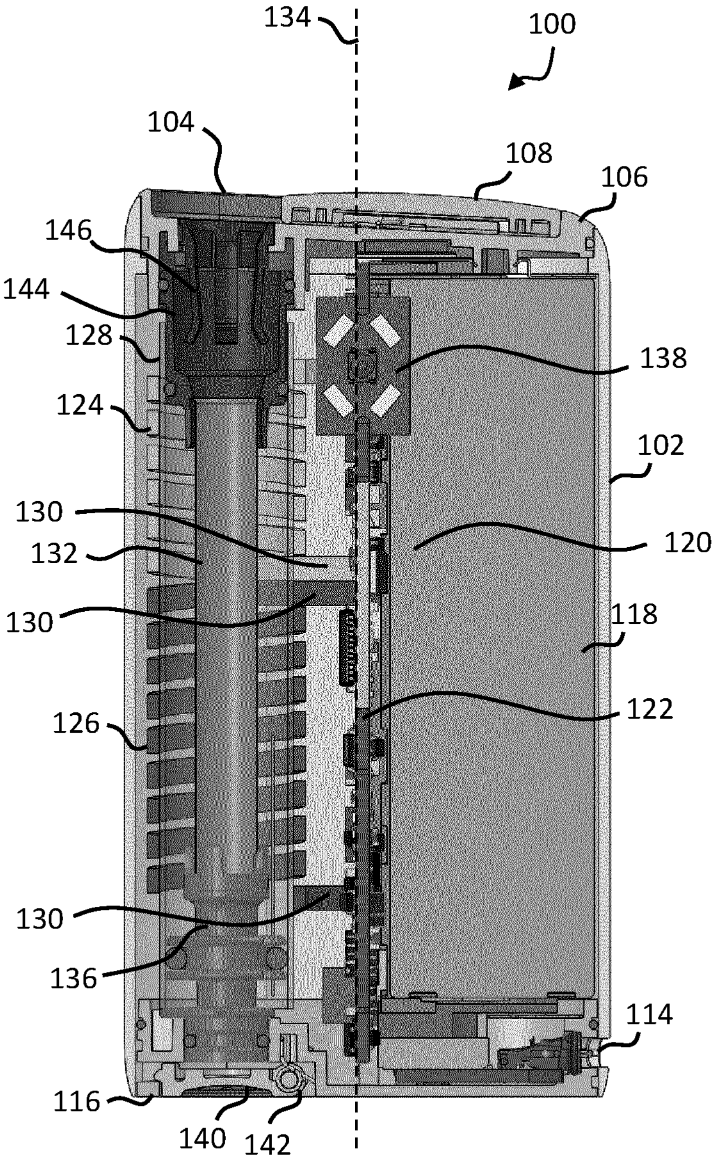
FIG. 3 shows a cross-sectional view of the aerosol provision device of FIG. 1.

FIG. 3 shows a side view of device 100 in partial cross-section. The outer cover 102 is present in this example. The rectangular cross-sectional shape of the first and second inductor coils 124, 126 is more clearly visible.

The device 100 further comprises a support 136 which engages one end of the susceptor 132 to hold the susceptor 132 in place. The support 136 is connected to the second end member 116.

The device may also comprise a second printed circuit board 138 associated within the control element 112.

The device 100 further comprises a second lid/cap 140 and a spring 142, arranged towards the distal end of the device 100. The spring 142 allows the second lid 140 to be opened, to provide access to the susceptor 132. A user may open the second lid 140 to clean the susceptor 132 and/or the support 136.

The device 100 further comprises an expansion chamber 144 which extends away from a proximal end of the susceptor 132 towards the opening 104 of the device. Located at least partially within the expansion chamber 144 is a retention clip 146 to abut and hold the article 110 when received within the device 100. The expansion chamber 144 is connected to the end member 106.

Figure 4:
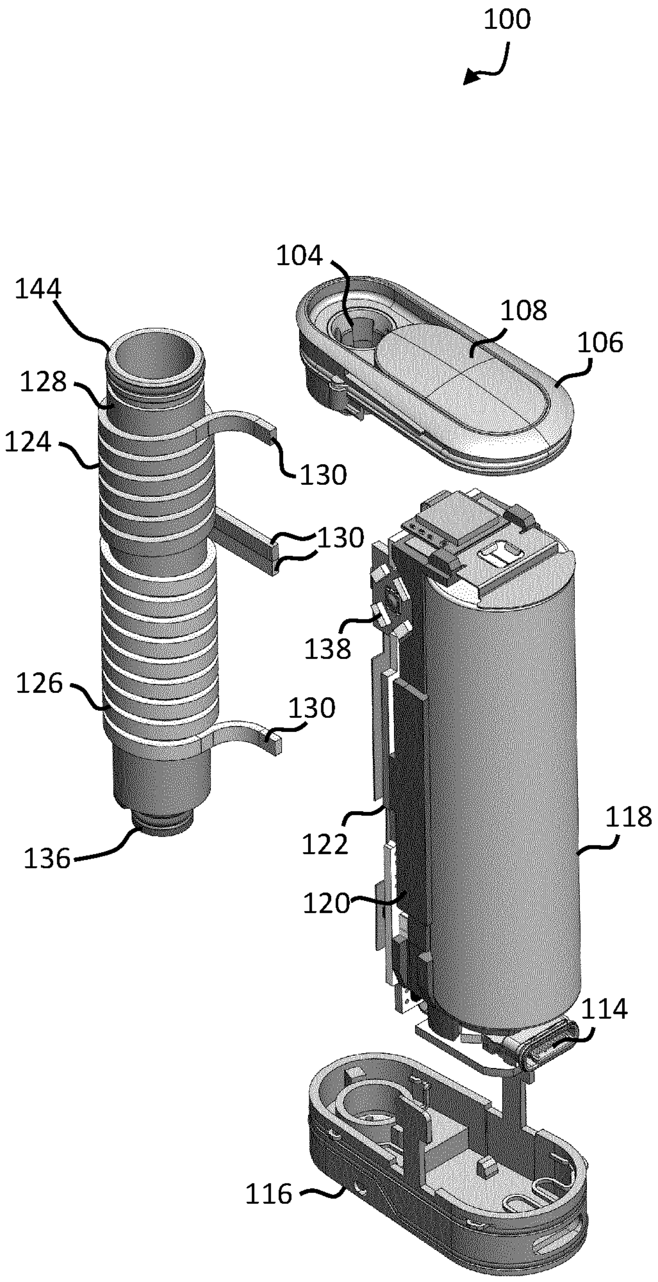
FIG. 4 shows an exploded view of the aerosol provision device of FIG. 2.

FIG. 4 is an exploded view of the device 100 of FIG. 1, with the outer cover 102 omitted.

Figure 5A:
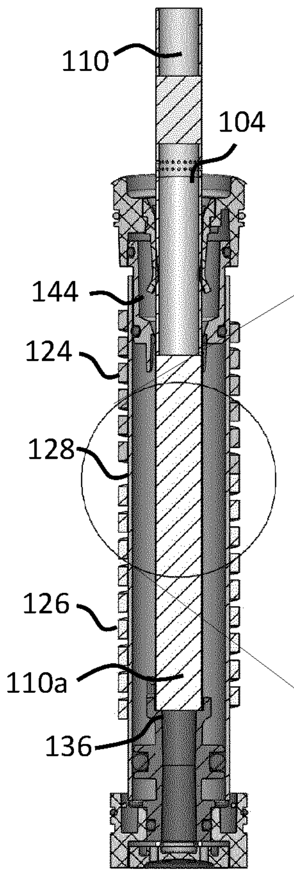
FIG. 5A shows a cross-sectional view of a heating assembly within an aerosol provision device according to an embodiment.
Figure 5B:
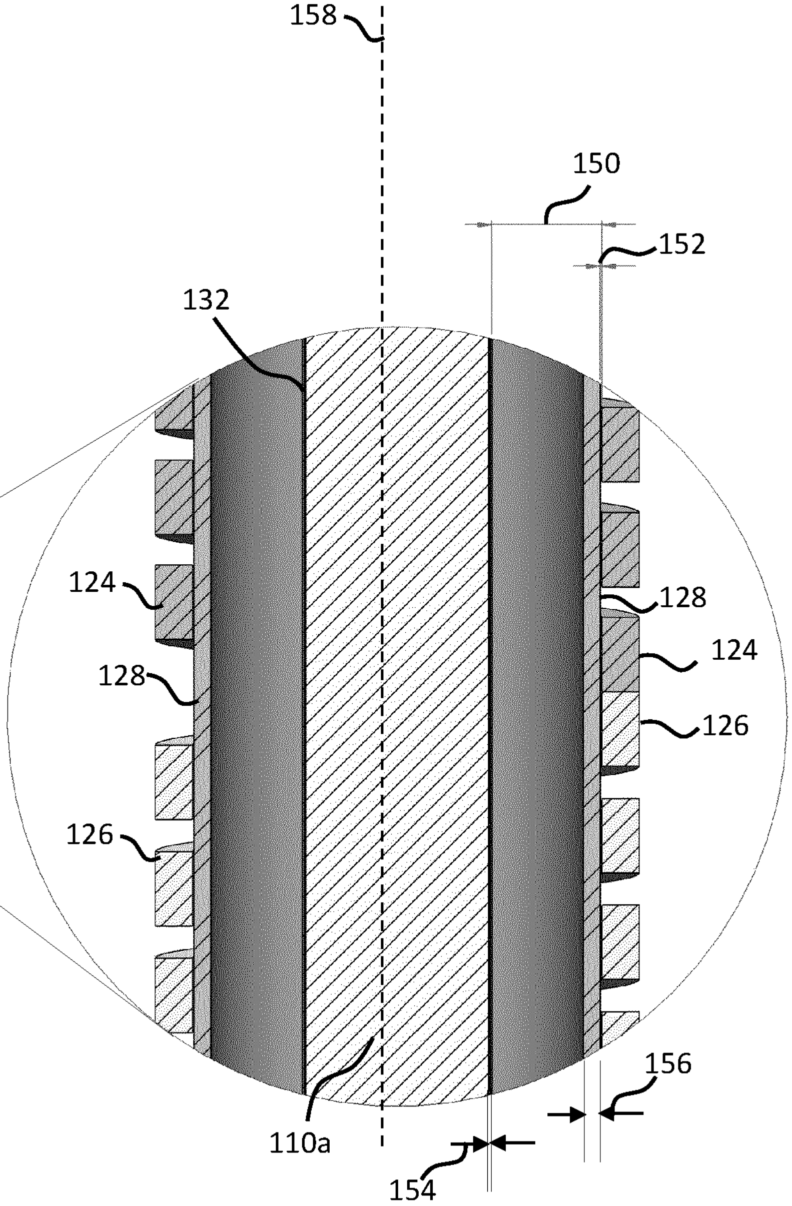
FIG. 5B shows a close-up view of a portion of the heating assembly of FIG. 5A.

FIG. 5A depicts a cross section of a portion of the device 100 of FIG. 1. FIG. 5B depicts a close-up of a region of FIG. 5A. FIGS. 5A and 5B show the article 110 received within the susceptor 132, where the article 110 is dimensioned so that the outer surface of the article 110 abuts the inner surface of the susceptor 132. This ensures that the heating is most efficient. The article 110 of this example comprises aerosol generating material 110*a*. The aerosol generating material 110*a* is positioned within the susceptor 132. The article 110 may also comprise other components such as a filter, wrapping materials and/or a cooling structure.

FIG. 5B shows that the outer surface of the susceptor 132 is spaced apart from the inner surface of the inductor coils 124, 126 by a distance 150, measured in a direction perpendicular to a longitudinal axis 158 of the susceptor 132. In one particular example, the distance 150 is about 3 mm to 4 mm, about 3-3.5 mm, or about 3.25 mm.

FIG. 5B further shows that the outer surface of the insulating member 128 is spaced apart from the inner surface of the inductor coils 124, 126 by a distance 152, measured in a direction perpendicular to a longitudinal axis 158 of the susceptor 132. In one particular example, the distance 152 is about 0.05 mm. In another example, the distance 152 is substantially 0 mm, such that the inductor coils 124, 126 abut and touch the insulating member 128.

In one example, the susceptor 132 has a wall thickness 154 of about 0.025 mm to 1 mm, or about 0.05 mm.

In one example, the susceptor 132 has a length of about 40 mm to 60 mm, about 40-45 mm, or about 44.5 mm.

In one example, the insulating member 128 has a wall thickness 156 of about 0.25 mm to 2 mm, 0.25 to 1 mm, or about 0.5 mm.

Figure 6:
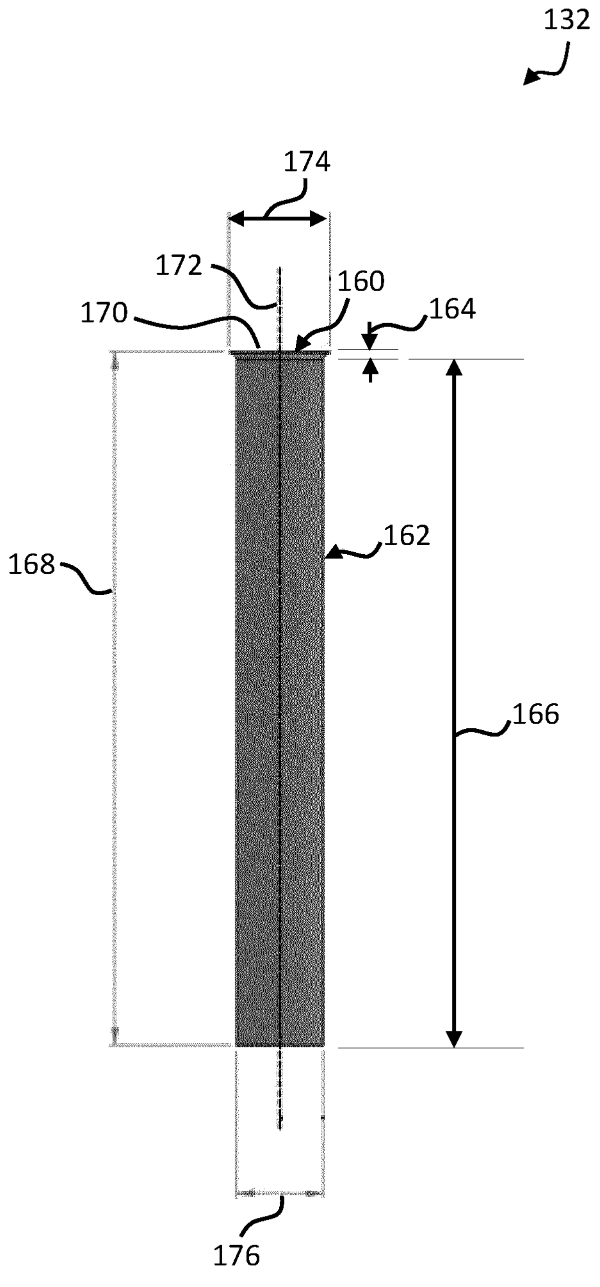
FIG. 6 shows a front view of an example susceptor assembly for use within an aerosol provision device according to an embodiment.

FIG. 6 depicts the susceptor 132 which, in this example, is constructed from a single piece of material and therefore has unitary construction. In other examples, the susceptor 132 may not have a unitary construction, and in some examples may comprise materials which are not heated inductively. As mentioned above, the susceptor 132 is hollow and can receive aerosol generating material for heating. To make it easier for the aerosol generating material to be received within the susceptor, the susceptor 132 has a flared end. The flared end is formed towards the end of the susceptor 132 which receives the aerosol generating material. In this example, the flared end is arranged at a proximal/mouth end of the susceptor 132.

The susceptor comprises a first portion 160 and a second portion 162, and the first portion 160 defines the flared end of the susceptor 132. The first portion 160 has a length dimension 164 and the second portion 162 has a length dimension 166. The susceptor 132 has a total length dimension 168. These length dimensions are measured in a direction parallel to a longitudinal axis 172 of the susceptor 132.

The first portion 160 defines an opening 170 at one end of the susceptor 132. This opening has a perimeter (shown more clearly in FIG. 7), and allows the aerosol generating material to be inserted into the hollow susceptor 132. The first portion 160 has a first internal cross section at the opening. The second portion 162 is arranged directly adjacent to the first portion and has a second internal cross section. As shown in FIG. 6, the first internal cross section is greater than the second internal cross section, thereby forming a susceptor with a wider end. The first and second cross internal sections are cross sections taken in a plane arranged perpendicular to the longitudinal axis 172 of the susceptor 132.

The first portion 160 may have a length dimension 164 of about 0.1 mm to about 5 mm and the susceptor 132 may have a length dimension 168 of about 40 mm to about 60 mm. In this particular example, the first portion 160 has a length dimension 164 of about 2 mm and the susceptor 132 has a length dimension 168 of about 44.5 mm so that the first portion's length 164 is less than 5% of the susceptor's overall length 168. These dimensions provide a good balance between allowing easy insertion of the aerosol generating material, while ensuring that the susceptor 132 is relatively compact and that impact on heating performance and airflow is reduced.

In this example the first portion 160 has an internal cross section which decreases in size from the opening 170 to the second portion 162 (i.e. in a direction measured along the axis 172). As such, the width of the first portion 160 becomes narrower along the length 164 of the first portion 160. The first portion 160 has a width dimension 174 at the opening. The width of the first portion 160 is measured in a direction perpendicular to the longitudinal axis 172. In contrast, the second portion 162 has an internal cross section which generally constant in size (in terms of area and width dimension). As such, the width 176 of the second portion 162 is the same along the entire length 166 of the second portion 160. The susceptor 132, as a whole, therefore has a funnel-like shape.

Figure 7:
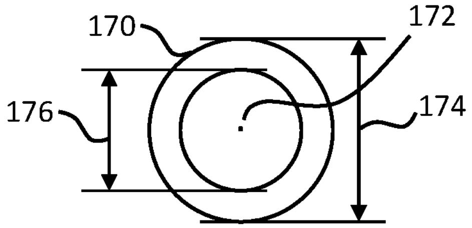
FIG. 7 shows a diagrammatic representation of a top view of the susceptor assembly of FIG. 6.

FIG. 7 depicts a top down view of the susceptor of FIG. 6. In this example, the susceptor 132 is cylindrical and the first and second internal cross sections have the same circular shape. The first portion 160 and the second portion 162 are arranged coaxially so that their midpoints are aligned on the axis 172. In contrast, FIG. 11 (discussed below), depicts a susceptor where the first and second portions are not coaxial.

As mentioned, the opening 170, and therefore the first internal cross section, has a width dimension 174. The second internal cross section has a width dimension 176. Because the susceptor is cylindrical, these width dimensions 174, 176 correspond to the greatest dimensions of the first and second internal cross sections (measured in a direction perpendicular to the axis 172). In other words, the widths correspond to diameters of the first and second portions of the susceptor.

In this example, the first internal cross section has a greatest dimension 174 of about 6.5 mm and the second internal cross section has a greatest dimension 176 of about 5.5 mm. The perimeter (i.e. the outer edge) of the first internal cross section at the opening 170 therefore extends about 0.5 mm further from the axis 172 than a perimeter of the second internal cross section. In other examples, the perimeter of the first internal cross section may extend about 0.4 mm to about 6 mm further from the axis than a perimeter of the second internal cross section. The external diameter of the second portion may be between about 1-2 mm greater than the internal diameter 176 of the second portion. In one example, the susceptor 132 has a wall thickness of about 0.05 mm, such that the external diameter of the second portion is about 5.6 mm.

Figure 8:
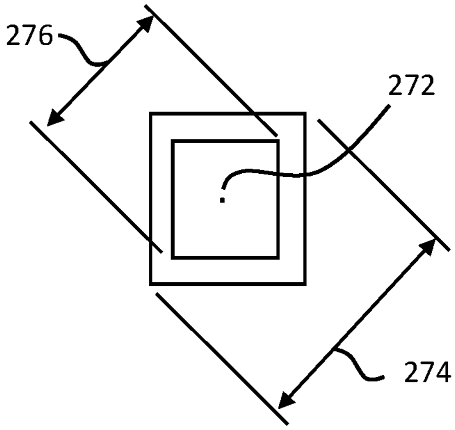
FIG. 8 shows a diagrammatic representation of a top view of another example susceptor assembly according to an embodiment.

If, instead of being cylindrical, the susceptor had a square or rectangular cross section, the greatest dimensions of the first and second internal cross sections would not correspond to the widths of the first and second portions. FIG. 8 depicts such an example. In this top down view of an alternative susceptor, the first internal cross section has a greatest dimension 274 measured in a direction perpendicular to an axis 272, and the second internal cross section has a greatest dimension 276 measured in a direction perpendicular to the axis 272.

Figure 9:
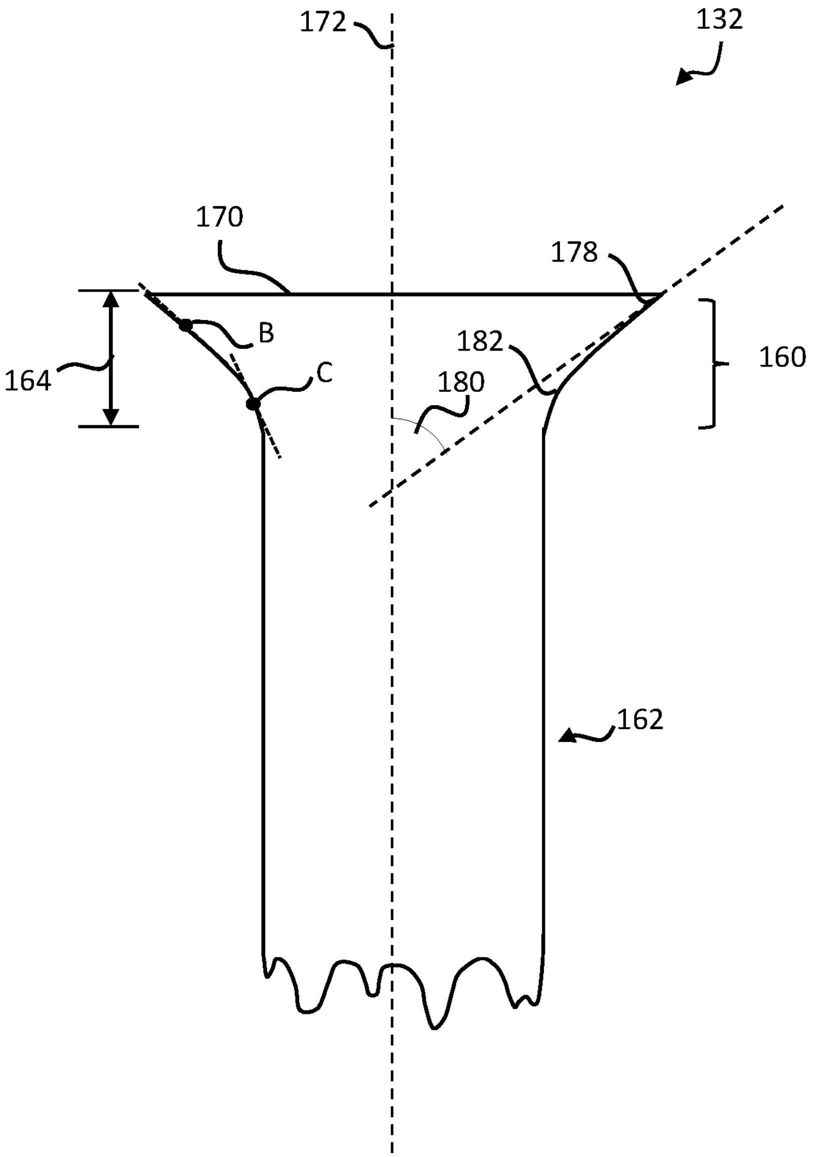
FIG. 9 shows a diagrammatic representation of a portion of the susceptor assembly of FIG. 6.

FIG. 9 depicts a diagrammatic representation of a top portion of the susceptor 132 of FIG. 6. Here the first portion 160 has an internal cross section which decreases from the opening to the second portion 162. In this example, the internal cross section of the first portion 160 has a varying decrease from the first cross section to the second cross section, i.e. the gradient of an internal surface 182 of the first portion 160 varies at different points along the first portion 160. For example, the gradient of a tangent to the inner surface at point B is different to the gradient of a tangent at point C. Thus, the first section 160 has a horn-like shape.

A tangent 178 to the inner surface 182 of the susceptor at the opening 170 of the susceptor is shown. An angle 180 is subtended between the longitudinal axis 172 and the tangent 178. In this particular example, the angle 180 is about 60°.

Figure 10:
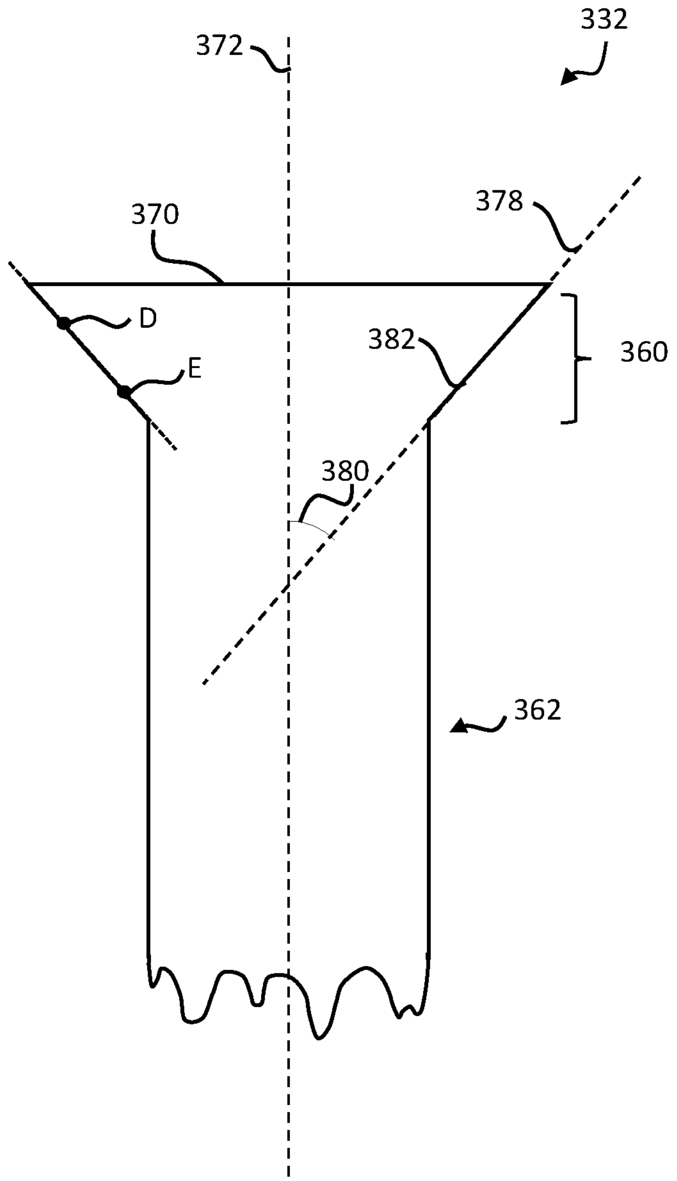
FIG. 10 shows a diagrammatic representation of a portion of another susceptor assembly according to an embodiment.

FIG. 10 depicts a diagrammatic representation of a top portion of another susceptor 332. As in FIG. 9, the first portion 360 has an internal cross section which decreases from the opening 370 to the second portion 362. In this example, the internal cross section of the first portion 360 has a constant decrease from the first cross section to the second cross section, i.e. the gradient of an internal surface 382 of the first portion 360 is the same at different points. For example, the gradient of a tangent to the inner surface at point D is the same as the gradient of a tangent at point E. Thus, the first section 360 may have a conical-like shape.

In this example, a tangent 378 to the inner surface 382 of the susceptor at the opening of the susceptor is shown. An angle 380 is subtended between the longitudinal axis 372 and the tangent 378. In this particular example, the angle 380 is about 50°.

Figure 11:
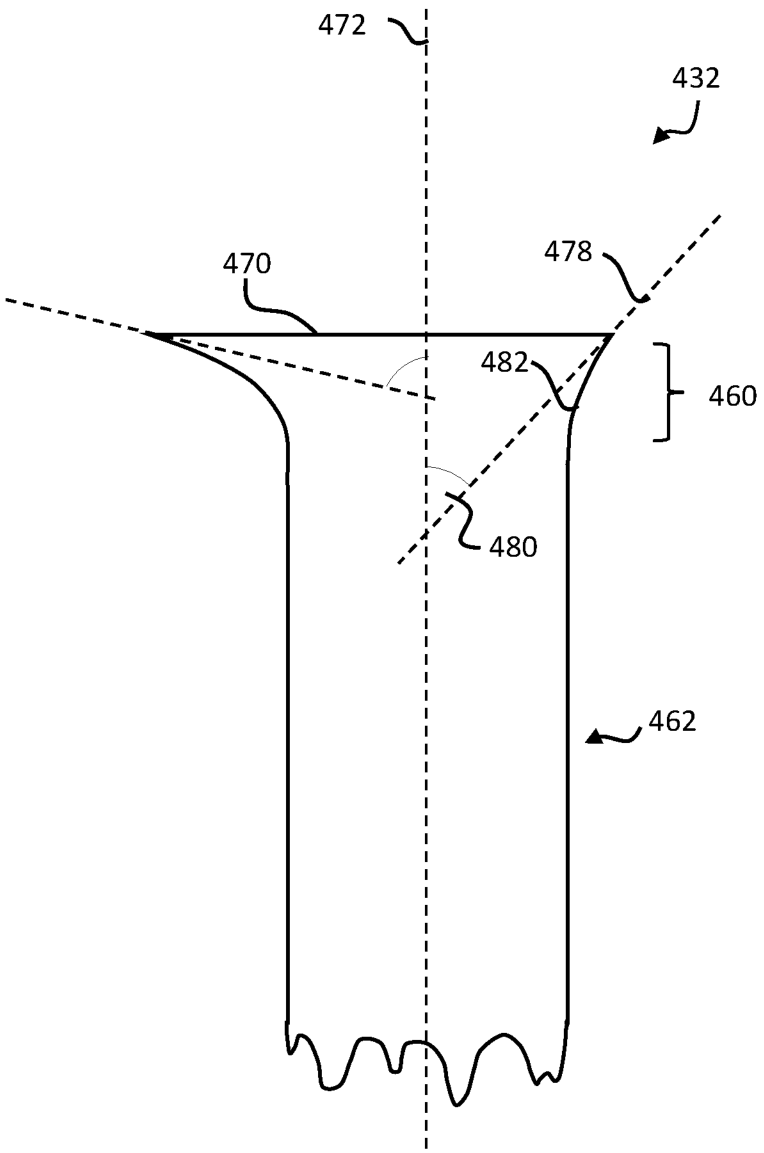
FIG. 11 shows a diagrammatic representation of a portion of another susceptor assembly according to an embodiment.

FIG. 11 depicts a diagrammatic representation of a top portion of another susceptor 432. As in FIGS. 9 and 10, the first portion 460 has an internal cross section which decreases from the opening 470 to the second portion 462. In this example, the internal cross section of the first portion 460 has a varying decrease from the first cross section to the second cross section, i.e. the gradient of an internal surface 482 of the first portion 460 varies at different points along the first portion 460 in a direction along the axis 472. In addition, the gradient of the internal surface 482 of the first portion 460 varies at different points around the axis 472. Therefore, the first cross section at the opening 470 is not coaxial with the second cross section. Instead, the midpoints of the first and second cross sections are not aligned on the axis 472.

In any of the examples described above, the second portion may have an internal cross section which varies in size along its length (in terms of area and width dimension).

In some examples (not illustrated) the susceptor may comprise three or more portions and so the second portion may not always extend from the first portion to the opposite/bottom end of the susceptor. For example, the susceptor may also comprise a third portion with a flared end arranged at the other end of the susceptor. The third portion may have a cross section that is smaller or greater than the first and/or second portions. This flared end arranged at the other end of the susceptor may allow the susceptor to be more easily accessed for cleaning.

Figure 12:
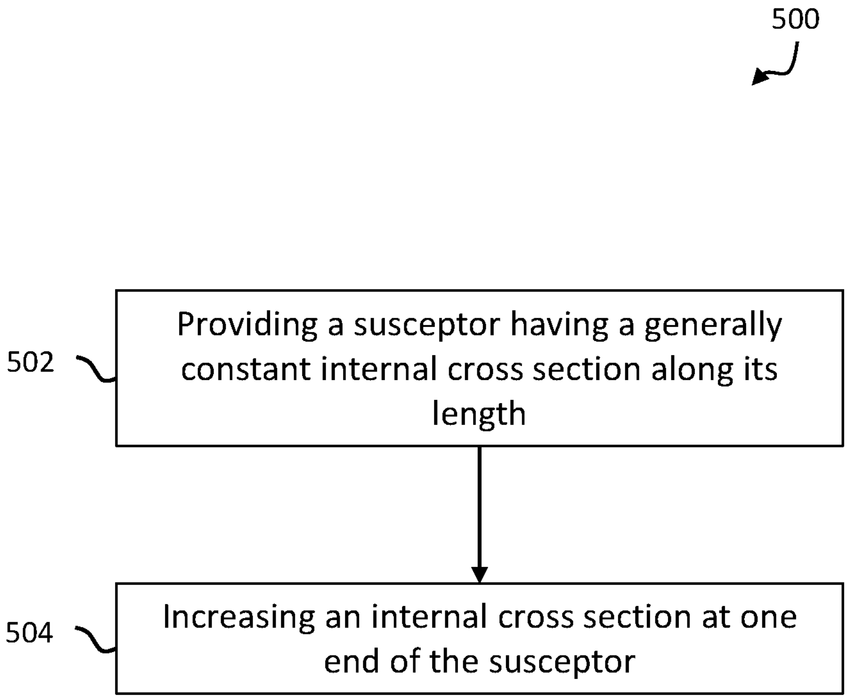
FIG. 12 shows a flow diagram of a method of manufacturing a susceptor assembly with a flared end according to an embodiment.

FIG. 12 depicts a flow diagram for a method of manufacturing a susceptor for an aerosol provision device. The method comprises, at 502, providing a susceptor having a generally constant internal cross section along its length. Such a susceptor may have a unitary construction, for example.

In a first example, the susceptor 132 is initially formed by rolling a sheet of material (such as metal) into a tube and sealing/welding the susceptor 132 along the seam. In some examples, the ends of the sheet overlap when they are sealed. In other examples, the ends of the sheet do not overlap when they are sealed.

In a second example, the susceptor 132 is initially formed by deep drawing techniques. This technique can provide a susceptor 132 that is seamless. The first example mentioned above can, however, produce a susceptor 132 in a shorter period of time.

Other methods of forming a seamless susceptor 132 include reducing the wall thickness of a relatively thick hollow tube to provide a relatively thin hollow tube. The wall thickness can be reduced by deforming the relatively thick hollow tube. In one example, the wall can be deformed using swaging techniques. In one example, the wall can be deformed via hydroforming, where the inner circumference of the hollow tube is increased. High pressure fluid can exert a pressure on the inner surface of the tube. In another example, the wall can be deformed via ironing. For example, the walls of the susceptor tube can be pressed together between two surfaces.

The method further comprises, at 504, increasing an internal cross section at one end of the susceptor, such that the internal cross section at the one end is greater than the generally constant internal cross section adjacent the one end. Increasing the internal cross section may comprise swaging, for example.

In some example methods, the end of the susceptor may be heated before the internal cross section is increased.

In other example methods the susceptor may have an internal cross section which varies along its length and the method comprises increasing an internal cross section at one end of the susceptor.

Figure 13A:
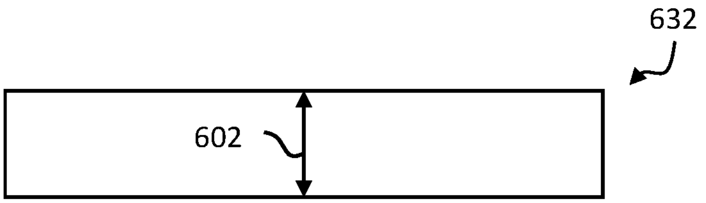
FIGS. 13A, 13B, 13C, and 13D show a diagrammatic representation of a swaging process according to an embodiment.
Figure 13B:
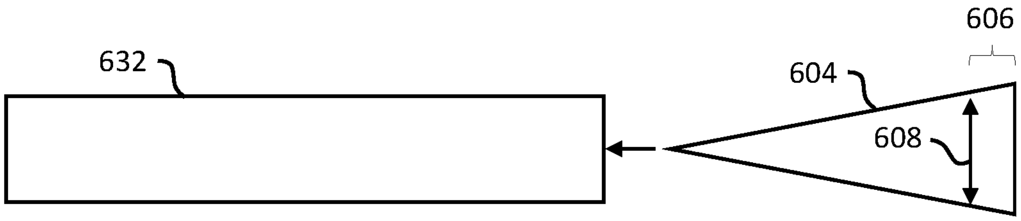

FIGS. 13A-13D depict various operations during a swaging process. As shown in FIG. 13A, a susceptor 632 is provided which has a generally constant cross section 602. The susceptor 632 in this example is hollow and cylindrical, so that the cross section 602 is circular in shape. FIG. 13B depicts an object 604, which is to be inserted into one end of the susceptor 632. The object 606 has a portion 606 which has an external cross section 608 that is greater than the internal cross section 602 of the susceptor 632.

Figure 13C:
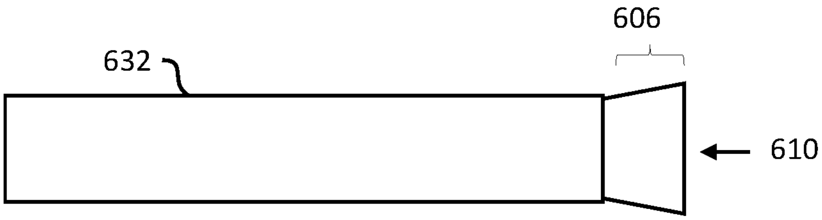
Figure 13D:
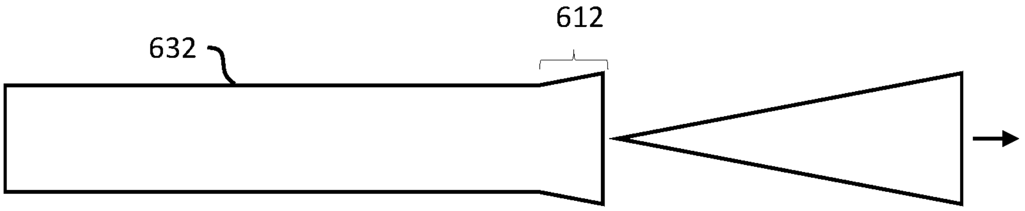

FIG. 13C depicts the object 604 once inserted into the susceptor 632. A force 610 is applied to one end of the object 604, which in turn drives the object further in to the susceptor 632. Because the object 604 has a region 606 with a larger cross section than the susceptor 632, this force 610 causes the end of the susceptor 632 to flare outwards. FIG. 13D depicts the susceptor 632 with a flared end 612. Here the object 604 has been removed from the susceptor 632.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An aerosol provision device comprising:
- at least one coil; and
- a unitary heater element in which heat is generated and arranged to receive aerosol generating material, wherein the unitary heater element comprises:
  - a first portion defining an opening at one end of the unitary heater element, the opening having a first internal cross section, the first portion heatable by the at least one coil, and
  - a second portion adjacent to the first portion, the second portion having a second internal cross section, wherein the first internal cross section is greater than the second internal cross section, and the second portion has a generally constant internal cross-section over the majority of the length of the section portion.

2. The aerosol provision device according to claim 1, wherein the first internal cross section and the second internal cross section are coaxial.

3. The aerosol provision device according to claim 1, wherein the first internal cross section and the second internal cross section are similar.

4. The aerosol provision device according to claim 1, wherein the first portion has an internal cross section which decreases from the first internal cross section to the second internal cross section.

5. The aerosol provision device according to claim 4, wherein the unitary heater element is funnel shaped.

6. The aerosol provision device according to claim 1, wherein the second portion extends from the first portion to a second end of the unitary heater element.

7. The aerosol provision device according to claim 1, wherein the unitary heater element defines an axis, and the first portion has a length dimension of about 0.1 mm to 5 mm measured along the axis.

8. The aerosol provision device according to claim 1, wherein:
- the unitary heater element defines an axis;
- the first portion has a first length dimension measured along the axis;
- the unitary heater element has a second length dimension measured along the axis; and
- the first length dimension is less than about 10% of the second length dimension.

9. The aerosol provision device according to claim 1, wherein the unitary heater element defines an axis, and wherein an angle of about 50° to about 70° is subtended between the axis and a tangent to an inner surface of the unitary heater element at the opening of the unitary heater element.

10. The aerosol provision device according to claim 1, wherein the unitary heater element defines an axis, and wherein the first internal cross section has a greatest dimension of about 6 mm to about 10 mm measured in a direction perpendicular to the axis.

11. The aerosol provision device according to claim 1, wherein the unitary heater element defines an axis, and wherein the second internal cross section has a greatest dimension of about 4 mm to about 7 mm measured in a direction perpendicular to the axis.

12. The aerosol provision device according to claim 1, wherein the unitary heater element defines an axis and a perimeter of the first internal cross section extends about 0.4 mm to about 3 mm further from the axis than a perimeter of the second internal cross section.

13. The aerosol provision device according to claim 1, wherein:
- the at least one coil comprises at least one inductor coil for generating a varying magnetic field;
- the unitary heater element is a susceptor assembly; and
- at least a portion of the susceptor assembly is heatable by penetration with the varying magnetic field.

14. A method of manufacturing a heater assembly for an aerosol provision device, comprising:
- providing a heater assembly having a length and a generally constant internal cross section along the length; and
- increasing an internal cross section at one end of the heater assembly, such that the internal cross section at the one end is greater than the generally constant internal cross section adjacent the one end.

15. The method according to claim 14, wherein increasing the internal cross section comprises swaging.

16. The method according to claim 14, further comprising heating the end of the heater assembly before increasing the internal cross section.

17. A unitary heater element in which heat is generated for an aerosol provision device, wherein the heater element is hollow to receive aerosol generating material, and wherein the heater element has a flared end, and wherein the unitary heater element comprises at least one portion having a generally constant internal cross-section over the majority of the length of the at least one portion.

18. An aerosol provision system, comprising:

the aerosol provision device according to claim 1; and an article comprising aerosol generating material.

* * * * *